United States Patent
Makaran et al.

(10) Patent No.: US 6,774,587 B2
(45) Date of Patent: Aug. 10, 2004

(54) MULTIPLE BRUSH-TYPE MOTOR CONTROL APPARATUS AND METHOD

(75) Inventors: John E. Makaran, London (CA); Dragan Radavcovic, London (CA)

(73) Assignee: Siemens VDO Automotive Inc., Mississauga (CA)

(*) Notice: Subject to any disclaimer, the term of this patent is extended or adjusted under 35 U.S.C. 154(b) by 0 days.

(21) Appl. No.: 10/255,152

(22) Filed: Sep. 25, 2002

(65) Prior Publication Data

US 2003/0117093 A1 Jun. 26, 2003

Related U.S. Application Data

(60) Provisional application No. 60/325,153, filed on Sep. 25, 2001.

(51) Int. Cl.[7] ................................................ H02P 1/54
(52) U.S. Cl. ........................ 318/34; 318/811; 318/599; 388/804
(58) Field of Search ................................. 318/430, 432, 318/434, 51, 811, 785, 34, 599, 541; 701/41, 254; 388/804

(56) References Cited

U.S. PATENT DOCUMENTS 5,350,326 A * 9/1994 Funami et al. ............ 440/61 R
5,916,130 A * 6/1999 Nakae et al. ................. 60/276
6,016,042 A * 1/2000 Miura et al. ................ 318/430
6,121,749 A * 9/2000 Wills et al. ................. 318/811

* cited by examiner

Primary Examiner—Karen Masih

(57) ABSTRACT

A motor circuit includes a first brush-type motor, a second brush-type motor, a switch, and a pulse width modulation circuit. The first brush-type motor has a first voltage connection and a second voltage connection, the second voltage connection adapted to be coupled to a source of DC voltage. The second brush-type motor has a third voltage connection and a fourth voltage connection, the fourth voltage connection adapted to be coupled to the source of DC voltage. The switch has a control input, a first contact and a second contact, the first contact coupled to the source of DC voltage, and the second contact coupled to the first voltage connection and the third voltage connection. The switch is operable to selectively connect the first contact to the second contact based on a voltage at the control input. The pulse width modulation circuit is operable to generate a pulse width modulated (PWM) signal. The pulse width modulation circuit is operably coupled to provide the PWM signal to the control input of the switch.

21 Claims, 2 Drawing Sheets

MULTIPLE BRUSH-TYPE MOTOR CONTROL APPARATUS AND METHOD

For priority purposes, this Application claims the benefit of U.S. Provisional Application No. 60/325,153 filed Sep. 25, 2001, entitled "Multiple Brush-Type Motor Control Apparatus And Method".

FIELD OF THE INVENTION

The present invention relates generally to motor circuits, and more particularly, to motor circuits that involve multiple brush-type motors.

BACKGROUND OF THE INVENTION

Convection air cooling is widely used in many industries, including the automotive industry. In automobiles, for example, heat from the internal combustion engine is transferred via coolant fluid to a radiator element. The radiator element then employs air cooling to dissipate the heat from the heated coolant fluid. Other devices, such as computers and other electronic circuits, often employ direct air cooling.

In any event, the quantity of heat transferred by air cooling is related to the size of the fan, as well as other factors, including fan speed and blade shape. However, fan size is often limited by the environment in which the fan is used. For example, the fan size in an automobile is limited by the amount of available space in the engine compartment of the automobile. Because fans rotate, any increase in fan size requires additional space in every radial direction.

One way to increase the effective cooling without requiring additional space in every radial direction is to employ multiple fans. For example, employing two identical, adjacent fans increases air flow while only requiring additional space in one direction. As a result, two smaller fans may fit more conveniently than one large fan in an application that has excess room in the horizontal direction but little or no excess room in the vertical direction.

An application that benefits from a multiple fan arrangement is the cooling system of an automobile. In many automotive designs, the use of two adjacent fans is more easily accommodated than a single large fan. One prior art automotive fan system employed two electrically commutated ("EC") motors which rotated the fans blades. Associated with each motor in such a system was a driver circuit that included one or more drive switches, a snubber, and other elements typically associated with EC motors.

One drawback to the above system involved the necessity of various wiring elements and harnesses to deliver the DC power to the driver circuits and motors, as well as control information to the driver circuits. In particular, EC motors typically require signals that turn the various driver circuit switches on and off at appropriate times during the rotation of the motor. Such control signals may be used to control the speed of the motors. In general, the source of the control signals is the engine control unit (ECU) of the automobile, and the source of DC power is the vehicle battery. Accordingly, multiple wires must be run to each of the two EC motors to allow control thereof. In addition, the EC motors require high frequency operation of the driver circuit switches to allow effective operation of the fan motor. Such high frequency switching undesirably creates electromagnetic interference issues that require mitigation.

Accordingly, there is a need for a dual motor system that avoids one or more of the shortcomings associated with the use of dual EC motors described above. Such need exists particularly in the automotive field for use of the dual motors for cooling fan purposes.

SUMMARY OF THE INVENTION

The present invention addresses the above need, as well as others, by providing a motor circuit and associated method that employs multiple brush-type motors that are controlled through a single switching device. The use of single switch control reduces the amount of wires that must be run from a control signal generator and/or DC power supply to a shroud or other fixture in which the motors are mounted. In another aspect of the invention, the use of brush-type motors allows for the use of low frequency switching signals, thereby eliminating or reducing electromagnetic interference issues.

A first embodiment of the present invention is a motor circuit that includes a first brush-type motor, a second brush-type motor, a switch, and a pulse width modulation circuit. The first brush-type motor has a first voltage connection and a second voltage connection, the second voltage connection adapted to be coupled to a source of DC voltage. The second brush-type motor has a third voltage connection and a fourth voltage connection, the fourth voltage connection adapted to be coupled to the source of DC voltage. The switch has a control input, a first contact and a second contact, the first contact coupled to the source of DC voltage, and the second contact coupled to the first voltage connection and the third voltage connection. The switch is operable to selectively connect the first contact to the second contact based on a voltage at the control input. The pulse width modulation circuit is operable to generate a pulse width modulated (PWM) signal. The pulse width modulation circuit is operably coupled to provide the PWM signal to the control input of the switch.

Another embodiment of the present invention is a fan assembly that includes a first fan blade set, a second fan blade set, a first brush-type motor, a second brush-type motor, a shroud, a switch and a wiring harness. The first brush-type motor has a first voltage connection and a second voltage connection and is operably coupled to rotate the first fan blade set. The second brush-type motor has a third voltage connection and a fourth voltage connection and is operably coupled to rotate the second fan blade set. The shroud supports the first brush-type motor and the second brush-type motor. The switch is secured to the shroud. The switch has a control input, a first contact and a second contact, the second contact operably coupled to the first voltage connection and the third voltage connection. The switch is operable to selectively connect the first contact to the second contact based on a voltage at the control input. The conductor harness includes a first DC conductor, a second DC conductor, and a control signal conductor. The conductor harness is affixed at a first end to the shroud. The first DC conductor is operably coupled to the second voltage connection and the fourth voltage connection, the second DC conductor is operably coupled to the first contact of the switch, and the control signal conductor is coupled to the control input.

In a preferred implementation the first DC conductor and the second DC conductor are coupled to positive and negative terminals of a DC power source, such as a battery. The control signal conductor is preferably coupled to a source of PWM signals.

The above described features and advantages, as well as others, will become more readily apparent to those of ordinary skill in the art by reference to the following detailed description and accompanying drawings.

DETAILED DESCRIPTION

Figure 1:
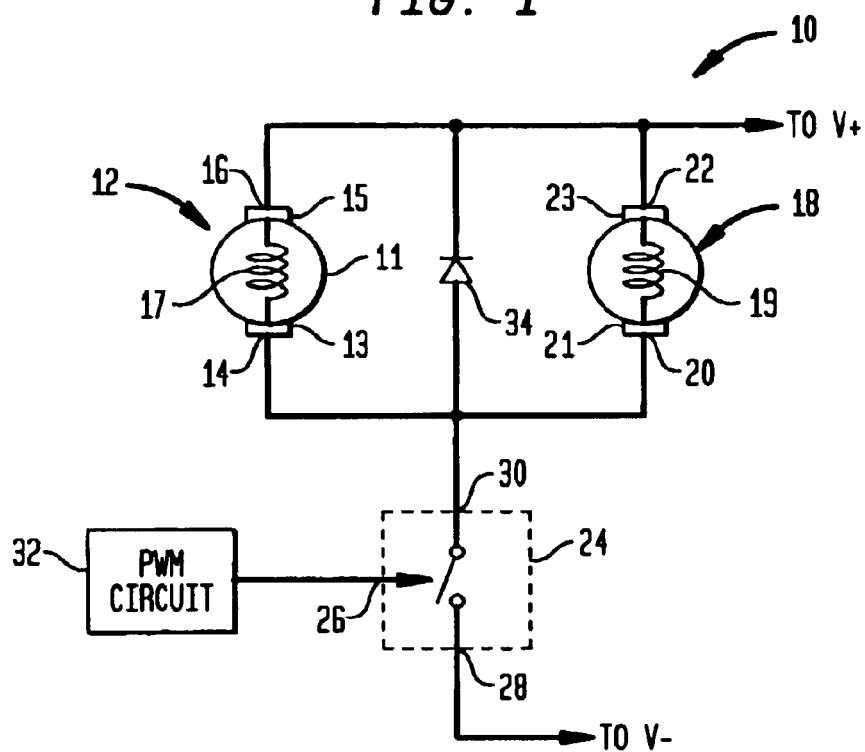
FIG. 1 shows a schematic block diagram of an exemplary motor circuit according to the present invention.

FIG. 1 shows a schematic block diagram of an exemplary motor circuit 10 according to the present invention. The motor circuit includes a first motor 12, a second motor 18, a switch 24 and a pulse width modulation circuit ("PWMC") 32. The motor circuit 10 further includes a freewheeling diode 34.

The first motor 12 is a brush-type motor, the construction of which is well known in the art, and generally includes a rotor 11, a stator, not shown, at least one winding or coil 17, and brushes 14 and 16. The first motor 12 includes a first connection 14 connected to one brush 13 and a second connection 16 connected to the other brush 15. As is known in the art, the first motor 12 is configured to rotate its rotor 11 in response to voltage applied across the first connection 14 and the second connection 16.

The second motor 18 is a brush-type motor that is preferably substantially identical to the first motor 12. In any event, the second motor 18 includes a rotor 19, a first connection 20 coupled to a first brush 21 and a second connection 22 connected to a second brush 23.

The second connection 16 of the first motor 12 and the second connection 22 of the second motor 18 are adapted to be electrically coupled to a terminal of a DC power source, not shown, which for example may be a terminal of a vehicular battery.

The switch 24 is a device that is operable to controllably electrically couple and decouple two contacts. By electrically coupled, it is meant that a non-insignificant amount of current may flow between the two contracts. To this end, the switch 24 includes a control input 26, a first contact 28 and a second contact 30.

The first contact 28 is adapted to be coupled to the terminal of the DC power source, not shown, that is opposite of the terminal coupled to the second connections 16 and 22 of the motors 12 and 18, respectively. Thus, for example, the second connection 16 of the first motor 12 and the second connection 22 of the second motor 18 may be connected to the positive terminal of a battery while the first contact 28 is coupled to the negative terminal of the battery.

The second contact 30 of the switch 24 is coupled to both the first connection 14 of the first motor 12 and the first connection 20 of the second motor 18. The switch 24 is configured to selectively connect the first contact 28 to the second contact 30 based on a voltage at the control input. To this end, the switch may be an n-channel metal oxide semiconductor field effect transistor. In the alternative, the switch 24 may comprise another type of transistor, a thyristor or a solid state relay.

The PWMC 32 is operable to generate a pulse width modulated (PWM) signal. The PWMC 32 may be a stand-alone circuit, or may suitably include or comprise a vehicle engine control unit or other type of processor. A pulse width modulation signal is a periodic pulse signal having two signal levels, a high level and a low level. The high level is typically referred to as the pulse of the pulse signal. PWM signals have a pulse frequency fs and a pulse width. The pulse frequency defines the frequency with which the pulses occur. The pulse width defines the duty cycle, or that portion of the pulse period 1/fs for which the pulse is present. Such signals are known in the art.

The PWMC 32 is operably coupled to provide the PWM signal to the control input 26 of the switch 24. Depending on the type of switch 24 that is employed, a driving circuit or bias circuit may be required to operably couple the control input 26 to the PWMC 32. Those of ordinary skill in the art may readily determined the appropriate device and accompanying driving or biasing circuit to employ based on their particular implementation needs.

The motor circuit 10 further includes the freewheeling diode 34 that is coupled in forward bias from the second contact 30 of the switch 24 to the second connection 16 of the first motor 12 and the second connection 22 of the second motor 18. As is known in the art, the freewheeling diode 34 allows current to flow back to the DC power supply to prevent an excessive voltage surge from developing at the second contact 30 of the switch 24 when the switch 24 is turned off during operation of the PWMC 32.

In the general operation of the motor circuit 10, the PWMC 32 provides a PWM signal to the control input 26. During the pulses (i.e. for the duty cycle of the PWM signal), the switch 24 electrically couples the first contact 28 and the second contact 30. The connection of the contacts 28 and 30 completes the circuit from the DC power source through both the first motor 12 and the second motor 18. When the pulse of the PWM signal is absent from the control input 26, the switch decouples the first contact 28 and the second contact 30, thereby opening the circuit through both the first motor 12 and the second motor 18. As a result, the motors 12 and 18 do not receive DC power when the PWM signal pulse is absent.

While sustained interruption of DC power to the motors 12 and 18 will theoretically cause the motors 12 and 18 to stop, the pulse frequency fs is sufficiently high enough such that the motors 12 and 18 effectively receive the average voltage level of the PWM signal. For example, if the pulse voltage level is 10 volts and the duty cycle is 50%, then the motors 12 and 18 operate as if they were receiving approximately 5 volts. The motors 12 and 18 effectively receive the average voltage because of energy storage due to mechanical momentum and the current storage capacity of the coils within the motors 12 and 18. Such effects are well known in the art.

In any event, because the rotational speed of the motors 12 and 18 is dependent upon the average voltage to the motors 12 and 18, the rotational speed of the motors 12 and 18 may be controlled by changing the duty cycle of the PWM signal. As a result, the PWMC 32 is preferably operable to receive speed control signals representative of a desired duty cycle (or motor speed) and generate a PWM signal having a duty cycle that corresponds to the received signal. The speed control signals may be generated by a processor or other device, not shown. Alternatively, the PWMC 32 may comprise a portion of a processor circuit that also performs other functions, including generation of motor speed control information.

While the frequency of the PWM signal may suitably be a high frequency, such as on the order of 10 kHz to 500 kHz, it has been found that the use of lower frequency signals, such as on the order of less than 1000 Hz, and preferably between 20 and 500 Hz have the advantage of producing less high frequency electromagnetic interference. In particular, when the PWM signal frequency is high, the switch 24 switches at the high frequency, and can create significant electromagnetic radiation issues that must be mitigated. Accordingly, in a preferred embodiment of the present invention, the PWM signal frequency is chosen to be less than 1000 Hz, and preferably between 20 and 500 Hz. Nevertheless, it will be appreciated that at least some of the advantages of the present invention may be obtained even when higher frequency PWM signals are employed.

In some cases, the use of low frequency PWM signals can lead to audible noise and vibration. Such problems are particularly relevant, but not limited to, the use of multiple motors for cooling fans in an automobile. Moreover, even low frequency PWM signals have high frequency components because PWM signals are typically square wave type signals. These high frequency signal components produce at least some problematic electromagnetic radiation. To reduce the strength and/or severity of electromagnetic radiation, audible noise and vibration, the preferred PWMC 32 of the present invention generates a PWM signal having a varying duty cycle.

In particular, in this preferred embodiment, the PWMC 32 is operable to generate PWM signals having a varying duty cycle wherein the average of the varying duty cycle corresponds to a predetermined rotor speed. An exemplary embodiment of a PWMC operable to generate varying duty cycle PWM signals is provided in U.S. patent application Ser. No. 09/536,561, filed Mar. 28, 2000, which is assigned to the assignee of the present invention and which is incorporated herein by reference.

Figure 2:
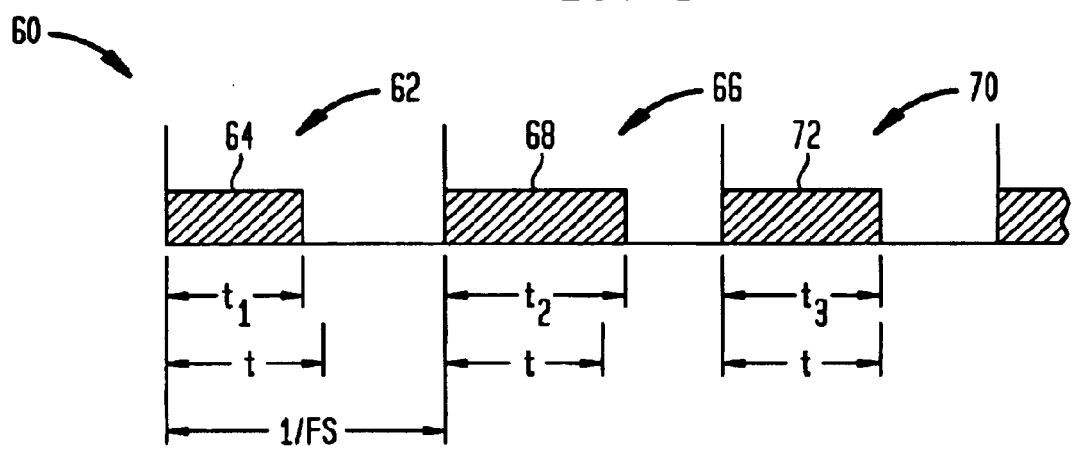
FIG. 2 shows a timing diagram of a varying pulse width modulation generated in accordance with one embodiment of the present invention.

In operation, the varying duty cycle PWMC 32 generates a varying duty cycle PWM signal that is provided to the control input 26. FIG. 2 shows a timing diagram of an exemplary pulse sequence 60 which may be generated by the varying duty cycle PWMC 32. The pulse sequence 60 represents three cycles 62, 66 and 70 of a varying duty cycle PWM signal in accordance with the present invention. It will be appreciated that the PWM signal will have substantially more cycles.

Each of the cycles 62, 66 and 70 has an on-time and an off-time. As discussed above, the on-time is the period of the cycle in which a pulse is present. Thus, for example, the first pulse 64 represents the on-time of the first cycle 62 of the PWM pulse sequence 60. By contrast, the off-time is the period of the cycle in which a pulse is not present. As is known in the art, the duty cycle is the ratio of the on-time or pulse period to the entire cycle period.

In accordance with the present invention, the duty cycles of the pulses in the first, second and third cycles 62, 66 and 60 vary while the cycle or switching frequency remains constant. Thus, in other words, the first pulse 64, the second pulse 68 and third pulse 72 vary in duration while the first cycle 62, the second cycle 66, and the third cycle 60 have the same duration. In addition, although the duty cycles vary, the average duty cycle for a large number of cycles of the PWM signal according to the present invention corresponds to a particular desired motor speed.

Thus, while the duty cycle varies, it has an average that corresponds to the desired motor speed. For example, in consideration of FIG. 2, assume that a duty cycle t corresponds to a desired motor speed. As shown in FIG. 2, the first cycle 62 has a duration 1/fs, but has a pulse 64 with a pulse duration of t1 (which is less than t). As a result, the duty cycle of the first cycle 62 is (t1)(fs). The second cycle 66, however, has the same duration 1/fs, but has a pulse 68 with a pulse duration of t2, which is greater than t. Accordingly, the duty cycle of second cycle 66, (t2)(fs), is greater than the duty cycle (t1)(fs) of the first cycle 62. The third cycle 70, moreover, has a pulse 72 with a pulse duration t3, which is approximately equal to t. Accordingly, the duty cycle of the third cycle 70, (t3)(fs), is greater than the duty cycle of the first cycle 62 but less than the duty cycle of the second cycle 66. However, the various duty cycles of the PWM signal according to the present invention advantageously have an average, over a substantial plurality of duty cycles, that corresponds to a desired motor speed. Thus, for example, if the desired motor speed corresponds to a constant duty cycle (t)(fs), then the PWM signal shown in FIG. 2 should have duty cycles such that:

$$[(t1)(fs)+(t2)(fs)+(t3)(fs)+ \ldots +(tN)(fs)]/N=(t)(fs).$$

The variation of the duty cycles as described in connection with FIG. 2 spreads the frequency distribution of the noise generated by the switch 24 of FIG. 1, as will be discussed further below.

In order to achieve the desired average duty cycle, the PWM signal may be generated such that the on-time or pulse period of each cycle is equal to a base on-time plus a random or pseudorandom on-time adjustment. Thus, for example, the pulse period tx of any given cycle may be given by the equation:

$$tx=t\pm(r*a*t)$$

where the value t is the base on-time that corresponds to the desired average duty cycle, the value r is a random or pseudorandom number between 0 and 1, and the value a is a weighting value for the adjustment, which may suitably be 0.05. In such a case, the random on-time adjustment, $\pm r*a*t$, would provide a random variation of plus or minus five percent of the desired average t value. Because a random adjustment is used, the average on-time adjustment will tend toward zero over several cycles. As a result, the average value of tx over time will tend toward t.

It is noted that in the example described in connection with FIG. 2, the pulse period tx is varied to change the duty cycle while the switching frequency fs is held constant. This allows the noise spectrum to be spread without encountering the difficulties associated with constantly changing the switching frequency. In particular, up-down counters and the like are widely used to generate PWM signals because they are convenient and inexpensive. Clock speed changes in such counters are usually accomplished by changing the divide down values that develop the switching frequency from input clock signal. Changing the divide down value, however, does not allow for much granularity in frequency alteration. As a result, if a counter (or a similar device) is employed to generate the PWM signal in a motor control circuit, the spectrum of the created noise will not be well distributed because of the lack of granularity in the frequency alteration. While use of a software clock may improve the granularity of the changing frequency and achieve better spreading, the use of a variable software clock is computationally burdensome and thus undesirable. Accordingly, this embodiment of the present invention provides the added advantage of not relying solely on frequency changes to accomplish noise spectrum spreading.

By varying the duty cycle of the PWM signal, the above described preferred embodiment of the present invention spreads the noise caused by the switch 24. In particular, the switch 24, which is typically a transistor or similar device, generates radiated noise having a frequency spectrum that corresponds to that of the PWM signal. In the preferred low frequency embodiment of the PWM signal, the switch 24 may even cause audible noise if the switching frequency and/or its harmonics are within the audible range. To this end, the PWM signal energy can be translated to the rotors 11 and 19 cause an audible vibration therein. The noise problem is pronounced when the PWM signal has a constant frequency and duty cycle because the noise is concentrated in the frequencies that are the harmonics of the PWM signal. The present invention, however, constantly changes the duty cycle, thereby altering the harmonics of the PWM signal and spreading the energy spectrum of the PWM signal. Thus, the radiated energy is spread over a wide range. Additionally, any potential audible noise is reduced because the rotors 11 and 19 cannot develop a consistent vibration frequency sufficient to cause significant audible noise.

Accordingly, brush-type motors such as the motors 12 and 18 may be run using a relatively low switching frequency, such as between 20 Hz and 500 Hz, with reduced risk of audible noise due to vibration of the rotor and whatever is being driven by the rotor. Running brush-type motors at such low frequencies greatly reduces the electromagnetic interference shielding burden on the motor drive circuit.

It is noted that the above described method of varying the duty cycle provides at least some benefit even if motor circuits that employ high frequency PWM signals. In those circuits, the varying duty cycle PWM signal spreads the electromagnetic radiation noise spectrum, thereby reducing the burden of mitigation.

Figure 3:
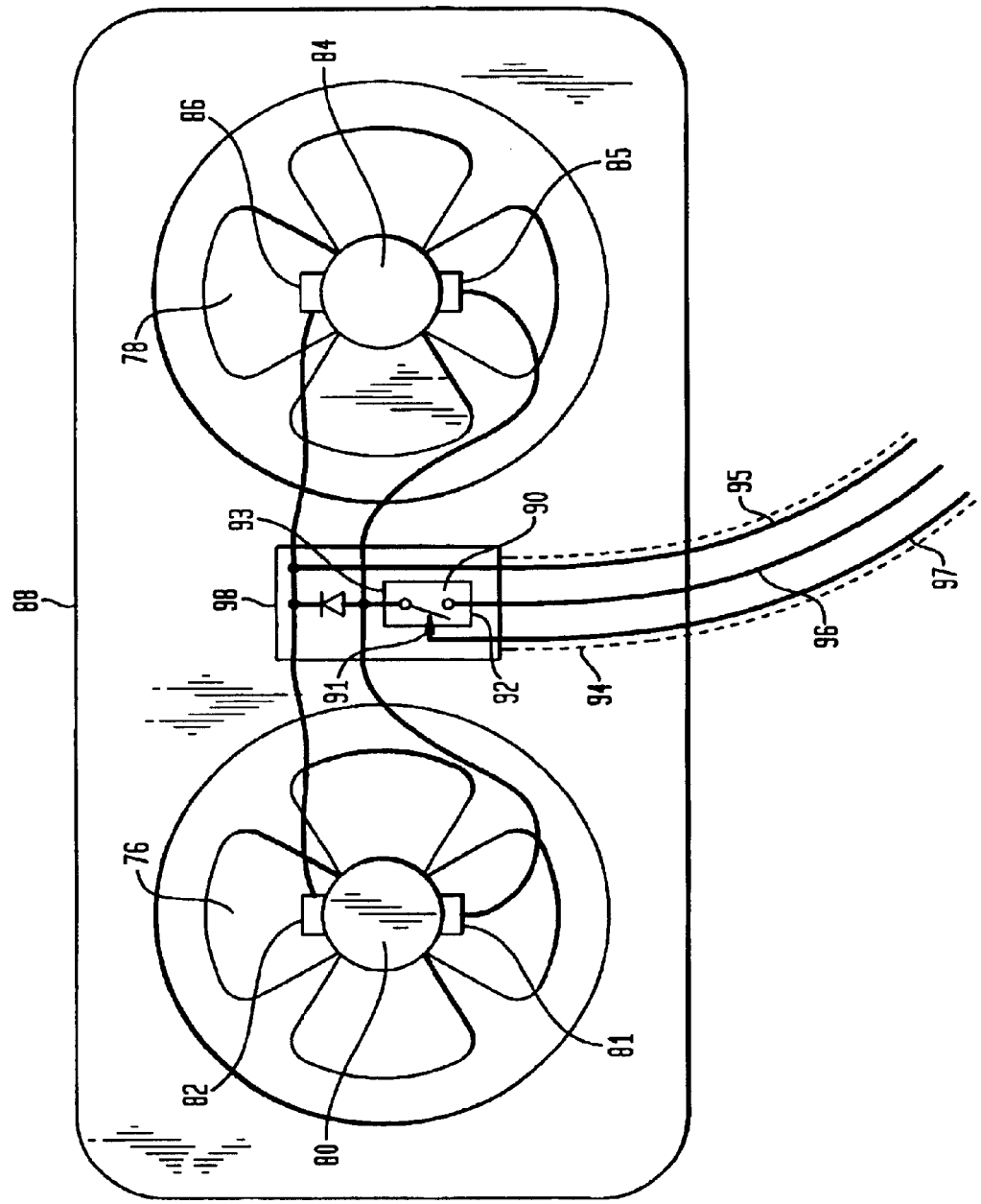
FIG. 3 shows a fan assembly according to the present invention.

The above invention provides a plurality of benefits for various environments in which multiple motors may be required. One particular environment in which the above invention provides several benefits is the vehicular cooling fan environment. Accordingly, one aspect of the present invention is a fan assembly that is suitable for use within a vehicle cooling system. FIG. 3 shows an exemplary embodiment of a fan assembly 74 according to the present invention.

Referring to FIG. 3, the fan assembly 74 includes a first fan blade set 76, a second fan blade set 78, a first motor 80, a second motor 84, a shroud 88, a switch 90 and a wiring harness 94. The first motor 80 and the second motor 84 are brush-type motors substantially similar to the first motor 12 described above in connection with FIG. 1. The first motor 80 includes a first connection 81 and a second connection 82 which are substantially the same as the first connection 14 and the second connection 16 of the first motor 12 of FIG. 1. The second motor 84 includes an analogous first connection 85 and an analogous second connection 86.

The first fan blade set 76 may suitably comprise multiple fan blades having a construction as is known in the art. The first motor 80 is configured to rotate the first fan blade set 76 in conjunction to the rotation of the rotor of the first motor 80. Such configurations are known in the art. Likewise, the second fan blade set 78 may suitably comprise multiple fan blades as is known in the art. The second motor 84 is configured to rotate the second fan blade set 78 in conjunction to the rotation of the rotor of the first motor 84. The details of the mechanical relationship between the fans 76, 78 and the motors 80, 84 are outside the scope of the invention and would be known to those of ordinary skill in the art. Accordingly, such details are omitted for purposes of clarity of exposition of the present invention.

The shroud 88 is a support device that operates as a housing for supporting the first motor 80 and the second motor 84, which in turn, rotatably support the first fan blade set 76 and the second fan blade set 78, respectively. The shroud 88 may suitably be constructed of a metallic, plastic or composite material. The shroud 88 has a shape that may be defined in part by the engine compartment of the vehicle, and may take into account the positioning of the radiator or other device being cooled. The detailed mechanical structure of the shroud 88 thus depends upon each particular implementation and would otherwise be known to those of ordinary skill in the art.

The switch 90 is substantially the same as the switch 24 of FIG. 1. Accordingly, the switch 90 includes a control input 91, a first contact 92 and a second contact 93. The first contact 92 is adapted to be coupled to the opposing terminal of the DC power source via a conductor 96 of the wiring harness 94, discussed further below. The second contact 93 of the switch 90 is coupled to the first connection 81 of the first motor 80 and the first connection 85 of the second motor 84. The switch 90 is configured to selectively connect the first contact 92 to the second contact 93 based on a voltage at the control input 91. As discussed above in connection with the switch 24 of FIG. 1, the switch 90 may be an n-channel metal oxide semiconductor field effect transistor. In the alternative, the switch 24 may comprise another type of transistor, a thyristor or a solid state relay. The switch 90 is secured to the shroud 88 in part to facilitate construction of the fan assembly 74 as a modular unit for ease of assembly into a vehicle. To dissipate heat generated by the switch 90, the switch 90 may be mounted onto a heat sink device 98, which is in turn mounted onto the shroud 88. Heat sinks of various sizes and shapes are well known.

The conductor harness 94 includes a first DC conductor 95, a second DC conductor 96, and a control signal conductor 97. The conductor harness 94 is affixed at a first end to the shroud 88. The first DC conductor 95 is electrically coupled to the second connection 82 of the first motor 80 and the second connection 86 of the second motor 84. The second DC conductor 96 is electrically coupled to the first contact 92 of the switch 90. The control signal conductor 97 is coupled to the control input 91 of the switch 90.

In the general operation of the fan assembly 74, the control input 91 of the switch 90 receives a PWM signal over the control signal conductor 97 from a PWM signal source, not shown, but which may suitably be a part of the engine control unit. During the pulses (i.e. during the duty cycle of the PWM signal), the switch 90 electrically couples the first contact 92 and the second contact 93. The connection of the contacts 92 and 93 completes the circuit from the first DC conductor 95, through both the first motor 80 and the second motor 84, to the second DC conductor 96. The first DC conductor 95 is preferably electrically coupled to a positive DC bus such as the positive battery terminal of the vehicle, not shown, while the second DC conductor 96 is electrically coupled to a negative DC bus such as the negative battery terminal of the vehicle, not shown. Accordingly, when the contacts 92 and 93 are connected, the motors 80 and 84 receive the voltage from DC power source.

When the pulse of the PWM signal is absent from the control input 91, the switch 90 decouples the first contact 92 and the second contact 93, thereby opening the circuit through both the first motor 80 and the second motor 84. As a result, the motors 80 and 84 do not receive DC power.

As discussed above, the pulse frequency is sufficiently high that the motors 80 and 84 effectively receive the average voltage level of the PWM signal. The motors 80 and 84 rotate the first fan blade set 76 and second fan blade set 78, respectively, at a rotational speed that is dependent upon the average voltage level received by the motors 80 and 84. Because the rotation speed of the motors 80 and 84 is dependent upon the average voltage to the motors 80 and 84, the rotational speed of the motors 80 and 84 may be controlled by changing the duty cycle of the PWM signal.

The above embodiment illustrated how two fans may be controlled using a single switch, thus reducing the number of wires that must be transported through the harness to the fan shroud 88. Moreover, by employing low frequency and/or varying duty cycle techniques, both electromagnetic and electromechanical noise can be controlled.

It will be appreciated that the above described embodiments are merely illustrative, and that those of ordinary skill in the art may readily devise their own implementations that incorporate the principles of the present invention and fall within the spirit and scope thereof. For example, while the above embodiments show two motors, the modification of those embodiments to incorporate three or more motors connected to a single switch would be readily apparent to those of ordinary skill in the art.

We claim:

1. A motor circuit comprising:

a first brush-type motor having a first voltage connection and a second voltage connection, the second voltage connection adapted to be coupled to a source of DC voltage;

a second brush-type motor having a third voltage connection and a fourth voltage connection, the fourth voltage connection adapted to be coupled to the source of DC voltage;

a switch having a control input, a first contact and a second contact, the first contact adapted to be coupled to the source of DC voltage, the second contact coupled to the first voltage connection and the third voltage connection, the switch operable to selectively connect the first contact to the second contact based on a voltage at the control input; and a pulse width modulation circuit operable to generate a pulse width modulated (PWM) signal, the pulse width modulation circuit operably coupled to provide the PWM signal to the control input of the switch.

2. The motor circuit of claim 1 wherein the switch comprises a metal oxide semiconductor field effect transistor.

3. The motor circuit of claim 1 wherein the switch comprises a solid state relay.

4. The motor circuit of claim 1 wherein the pulse width modulation circuit is further operable to generate the PWM signal such that the PWM signal has a variable duty cycle.

5. The motor circuit of claim 4 wherein the pulse width modulation circuit is further operable to generate the PWM signal such that the PWM signal has a pulse frequency of between 20 Hz and 500 Hz.

6. The motor circuit of claim 1 wherein the pulse width modulation circuit is further operable to generate the PWM signal such that the PWM signal has a pulse frequency of between 20 Hz and 500 Hz.

7. A motor control circuit for use in a motor circuit, the motor control circuit comprising:
a varying duty cycle pulse width modulation circuit operable to generate a pulse width modulated (PWM) signal having a frequency of below 500 Hz and having a varying duty cycle, wherein an average of said varying duty cycle corresponds approximately to a desired motor speed; and
a switch having a control input operably coupled to the varying duty cycle pulse width modulation circuit to receive the PWM signal therefrom, the switch further including first and second terminals, the first terminal adapted to be coupled to a first brush-type motor and to a second brush-type motor, the second terminal adapted to be coupled to a DC voltage source.

8. The motor circuit of claim 7 wherein the switch comprises a metal oxide semiconductor field effect transistor.

9. The motor circuit of claim 7 wherein the switch comprises a solid state relay.

10. A method of operating brush-type motors, comprising:
a) generating a pulse width modulated (PWM) signal
b) provide the PWM signal to a control input of a switch; and
c) employing the switch to operably couple a terminal of a DC power source to terminals of a first brush-type motor and a second brush-type motor responsive to the PWM signal.

11. The method of claim 10 wherein step b) further comprises providing the PWM signal to the control input of the switch, the switch comprising a metal oxide semiconductor field effect transistor.

12. The method of claim 10 wherein step b) further comprises providing the PWM signal to the control input of the switch, the switch comprising a solid state relay.

13. The method of claim 10 wherein step a) further comprises generating the PWM signal such that the PWM signal has a variable duty cycle.

14. The method of claim 13 wherein step a) further comprises generating the PWM signal such that the PWM signal has a pulse frequency of between 30 Hz and 500 Hz.

15. The method of claim 10 wherein step a) further comprises generating the PWM signal such that the PWM signal has a pulse frequency of between 20 Hz and 500 Hz.

16. A fan assembly comprising:
a first fan blade set and a second fan blade set;
a first brush-type motor having a first voltage connection and a second voltage connection, the first brush-type motor operably coupled to rotate the first fan blade set;
a second brush-type motor having a third voltage connection and a fourth voltage connection, the second brush-type motor operably coupled to rotate the second fan blade set;
a shroud supporting the first brush-type motor and the second brush-type motor;
a switch secured to the shroud, the switch having a control input, a first contact and a second contact, the second contact operably coupled to the first voltage connection and the third voltage connection, the switch operable to selectively connect the first contact to the second contact based on a voltage at the control input; and
a conductor harness including a first DC conductor, a second DC conductor, and a control signal conductor, the conductor harness affixed at a first end to the shroud, the first DC conductor operably coupled to the second voltage connection and the fourth voltage connection, the second DC conductor operably coupled to the first contact of the switch, the control signal conductor coupled to the control input.

17. The fan assembly of claim 16, further comprising a heat sink affixed to the shroud, the heat sink in a heat transfer relationship with the switch.

18. The fan assembly of claim 17 wherein the heat sink is interposed between the switch and the shroud.

19. The fan assembly of claim 16 wherein the switch comprises a metal oxide semiconductor field effect transistor.

20. The fan assembly of claim 16 wherein the switch comprises a solid state relay.

21. The fan assembly of claim 16 further comprising a pulse width modulation circuit operable to generate a pulse width modulated (PWM) signal, the pulse width modulation circuit operably coupled to provide the PWM signal to the control signal conductor.

* * * * *

UNITED STATES PATENT AND TRADEMARK OFFICE
CERTIFICATE OF CORRECTION

PATENT NO. : 6,774,587 B2
DATED : August 10, 2004
INVENTOR(S) : John Edward Makaran and Dragan Radakovic It is certified that error appears in the above-identified patent and that said Letters Patent is hereby corrected as shown below:

Title page,
Item [75], Inventors, replace "Radavcovic" with -- Radakovic --

Signed and Sealed this

Thirtieth Day of November, 2004

JON W. DUDAS
*Director of the United States Patent and Trademark Office*